UNITED STATES PATENT OFFICE.

ALDUS C. HIGGINS, OF WORCESTER, MASSACHUSETTS.

METHOD OF TREATING ALUMINOUS MATERIALS.

No. 930,376.  Specification of Letters Patent.  Patented Aug. 10, 1909.

Application filed May 31, 1907. Serial No. 376,565.

*To all whom may it concern:*

Be it known that I, ALDUS C. HIGGINS, a citizen of the United States, residing at Worcester, in the county of Worcester and State of Massachusetts, have invented certain new and useful Improvements in Methods of Treating Aluminous Materials, of which the following is a specification.

This invention relates to the treatment of artificially prepared aluminous materials, and particularly the product commercially used as an abrasive, the object of the invention being to provide a method of treating such materials to render them better adapted for the manufacture of abrasive implements or articles and for other purposes. According to the invention such materials are subjected, preferably after they have been crushed or otherwise subdivided into fragments of a size adapted for use or for the preparation of abrasive implements and the like to a high temperature under oxidizing conditions.

The material produced by the fusion of alumina, raw or calcined bauxite or other aluminous material in the electric furnace and commercially used as an abrasive usually contains as non-essential ingredients or impurities small proportions of such elements as iron, titanium and silicon, or compounds or alloys of these. As the electric furnace smelting proceeds under reducing conditions, due to the use of carbon electrodes or in some cases to the admixture of small proportions of carbon with the charge, these several metals may occur in their reduced or metallic form, or as alloys, carbids or oxids, more or less disseminated throughout the product. These non-essential bodies occur in the implements or articles prepared from the abrasive material and are often somewhat irregularly disseminated therein; they are subject to oxidation or other change or transformation in the after-treatment of these implements or articles, and give rise to objectionable local modifications of the material or structure.

I have found that the above objections may be avoided by proceeding substantially as follows: The product prepared in the usual manner by fusing an aluminous material in the electric furnace is crushed, preferably although not necessarily to such size or sizes as may be suited for the subsequent manufacture of abrasive implements or articles, and is then subjected to a roasting operation under oxidizing conditions, the temperature, duration and conditions of the roasting being so controlled as to secure as complete oxidation of the impurities or non-essential components as is practicable, or such degree of oxidation thereof that no further substantial transformation of these impurities will occur in the course of the subsequent firing of the implements or articles. The roasted material may then be subjected to further treatment, as grinding or crushing, washing with water or with acid or alkaline solutions, grading, etc., and may then be molded and fired in the usual manner, using any of the customary vitrified or pottery bonds, as for instance a mixture of clay and feldspar; or the suitably graded material may be directly utilized, or may be applied to the production of articles not requiring firing, as for instance abrasive papers and the like; for this latter use it is found to present particular advantages.

The product treated as above is uniform in character, and implements or articles prepared therefrom by bonding either with or without firing are found to possess increased strength and durability.

I claim:

1. The method of treating artificially prepared aluminous materials which consists in subjecting such materials, suitably subdivided, to heat under oxidizing conditions, and thereby oxidizing impurities therein.

2. The method of treating artificially prepared aluminous materials which consists in subjecting such materials, suitably subdivided, to heat under oxidizing conditions, and thereby oxidizing impurities therein, then adding a bonding agent and forming articles from the prepared material.

3. The method of treating artificially prepared aluminous materials which consists in subjecting such materials, suitably subdivided, to heat under oxidizing conditions, and thereby oxidizing impurities therein, molding the prepared material into articles and firing the same.

In testimony whereof, I affix my signature in presence of two witnesses.

ALDUS C. HIGGINS.

Witnesses:
F. H. LINCOLN,
C. O. SMITH.